United States Patent Office 3,814,804
Patented June 4, 1974

3,814,804
USE OF COBALT DODECENEDIOATE FOR TREATING SKIN CONDITIONS
August J. Pacini, San Pedro, Calif., assignor to Purex Corporation, Ltd., Lakewood, Calif.
No Drawing. Application Jan. 22, 1970, Ser. No. 10,680, now Patent No. 3,720,773, dated Mar. 13, 1973, which is a division of application Ser. No. 715,167, Nov. 24, 1970, now Patent No. 3,542,826. Divided and this application Jan. 17, 1972, Ser. No. 218,621
Int. Cl. A61k 27/00
U.S. Cl. 424—295                    1 Claim

ABSTRACT OF THE DISCLOSURE

The cobalt salt of trans-dodecenedioic acid has been found to be a highly effective agent against unindurated acne, neurodermatitis, seborrheic dermatis, psoriasis, burns, ulcerations and pruritis.

REFERENCES TO RELATED APPLICATIONS

This application is a division of and incorporates by reference my earlier co-pending application, Ser. No. 10,680 Jan. 22, 1970, now U.S. Pat. No. 3,720,773, issued Mar. 13, 1973, which application Ser. No. 10,680, is a division of and incorporates by reference earlier filed United States application No. 715,167, now United States Pat. No. 3,542,826 issued Nov. 24, 1970.

BACKGROUND OF THE INVENTION

(1) Field of the invention

The invention is concerned with the cobalt salt of trans-dodecenedioic acid (TTA) and it use in the treatment of unindurated acne, neurodermatitis, seborrheic dermatitis, psoriasis, burns, ulcerations and pruritis.

(2) Prior art

Aloe Vera in its unextracted form has been used for centuries for its vulnerary therapeutic effectiveness, particularly against burns. TTA is obtained by exhaustive extraction of Aloe Vera or may be synthetically produced. The cobalt salt of TTA is a new compound, see U.S. Pat. 3,720,773 and U.S. Pat. 3,542,826.

SUMMARY OF THE INVENTION

It has now been discovered that the cobalt salt of TTA is vastly more effective than TTA or Aloe Vera in treatment of burns, wounds, ulcers and various disorders of the skin inclusive of psoriasis.

DESCRIPTION OF THE PREFERRED EMBODIMENTS

Traumatic acid is also known as 1-decene-1, 10-dicarboxylic acid and exists in cis and transforms, the latter, hereinafter referred to as TTA, being the more biologically active.

TTA may be prepared as follows: Undecylenic acid is oxidized to hydroxyformoxyhendecanoic acid with hydrogen peroxide in formic acid which is then hydrolysed to 10,11 - dihydroxyhendecanoic acid with sodium hydroxide. Treatment with periodic acid transforms the 10,11-dihydroxyhendecanoic acid into the sebacic semi-aldehyde which is condensed with malonic acid in the presence of pyridine. Upon acidification of the condensation mixture, 1-decane-1,10-dicarboxylic acid, i.e. traumatic acid, precipitates. This product is purified by recrystallization from a solvent. While the acid per se is biologically active, the cobalt salt is many times more active.

Salts of TTA are prepared by replacement of the carboxyl hydrogen with cobalt from a suitable metal salt, e.g. carbonate, acetate, chloride and the like, e.g. cobalt carbonate.

Quantities of traumatic acid or salt employed are typically quite small. Thus as little as 0.00005 percent are suitable.

The cobaltous TTA is applied topically in a suitable carrier e.g. liquids such as water, physiological saline, aqueous alcohol, or in ointments, salves, creams, lotions which a pharmaceutically acceptable and either inert or possessed of beneficial properties themselves.

Preparation of TTA

A one liter three-necked flask is equipped with a mechanical stirrer, a thermometer and a dropping funnel. In the flask are placed 184 g. (1 mole) of undecylenic acid and 200 g. (4.35 moles) of formic acid. The stirrer is started and the reaction mixture is warmed by a water bath to 40° C. for at least one-half hour longer after all the peroxide has been added.

The reactions mixture is transferred to a suitable flask for vacuum distillation and the formic acid and any water is removed by distilling under full vacuum of the water pump. The residual hydroxyformoxyhendacanioc acid is now ready for hydrolysis. This is accomplished by boiling for one hour and acidified to a pH of 2, or slightly lower with 6 N, hydrochloric acid. After cooling well in an ice bath, the solid is collected on a Büchner funnel (pre-chilled), washed with ice water and sucked as dry as possible. The solid is dried in a vacum desiccator over flake sodium hydroxide. 205.0 g. of product equal to 93.92% of the theoretical yeild were obtained.

A solution of 42.78 g. (0.2 mole) of sodium metaperiodate (NaIO$_4$) in 600 ml. of 1 N sulfuric acid is prepared. In a 1-liter flask equipped with a mechanical stirrer, a thermometer and a dropping funnel are placed 400 ml. of ethanol and 43.6 g. (0.2 mole) of 10,11-dihydroxyhendecanoic acid. This solution is warmed to 40° C. and the periodate solution is added through the separatory funnel at a rapid rate while stirring the mixture. The temperature is maintained at 40° C., for 30–40 minutes after which the solution is cooled to 20° C., and any inorganic salts that separated were collected on a Büchner funnel, sucked dry and washed with ether to remove adherent organic material.

The ether washing is used to extract the aqueous filtrate along with additional ether as may be needed. A total of three extractions with about 200 ml. of ether in each extraction should be used. The combined ether extract is shaken with a small amount of anhydrous sodium sulfate to remove most of the water, after which the ether is distilled. The residual oil is then submitted to the full vacuum of a water pump to remove any alcohol and water remaining. An oily residue sebacic semi-aldehyde, weighing 3.0 g. is obtained, (96.77% of theoretical yield.) This product is used in the next step without further purification.

18.6 g. (0.1 mole) of the sebacic semi-aldehyde is mixed with 11.45 g. 0.11 mole) of malonic acid and 10.28 g. (0.13 mole) of pyridine in a 500 ml. round bottom flash. The mixture is allowed to stand for 24 hours at room temperature and then heated for 5 hours on a steam bath. The mixture is then cooled and diluted with about 10 volumes of water. Upon acidification to pH 2 N sulfuric acid and chilled to near 0° C., the crude 1-decene-1, 10-dicarboxylic acid is collected on a Büchner funnel. It is sucked dry and washed with a small amount of ice cold water. Dry in a vacuum desiccator over flake caustic. The crude trans - 1 - decene - 1,10 - dicarboxylic acid, weighing 18.0 g., is recrystallized twice from boiling solvent. The yield is 11.49 g. (60.33% of theory).

The dicarboxylic acid obtained in this fashion has a molecular formula $C_{12}H_{20}O_4$, molecular weight 228.28, melts at 161°–165° C, when crystallized from ethyl acetate, contains an unsaturated linkage, is very sparingly soluble in water but fairly soluble in alcohol, ethyl acetate, bensol, chloroform, ether, glycerin, propylene glycol, is acid and shows a neutralization equivalent of 115, indicating dibasicity.

Similar acids to TTA have been identified by plant physiologists as among the many factors involved in plant growth phenomena, and numerous closely allied acids have been synthesized e.g. having formulas of the type $HOOC(CH_2)_nCH=CHCOOH$ and $$HOOC(CH_2)_n=CHCH_2COOH$$

The following dicarboxylic acids failed to effect any acceleration of wound healing in experimentally induced wounds in rabbit ears over controls in opposite ears 1-nonene-1,9-, 2-nonene-1,9-, 2-decene-1,10-, 1-tridecene-1, 13-, and 2-tridecene-1, 13-dicarboxylic acid. Dodecenedioic acid is strikingly effective in the management of conditions such as psoriasis among others.

It is clear that dicarboxylic acid substances known to be related to plant growth stimulation, of which there are many, and never before identified with the treatment of human animal diseases, are not therapeutically useful in the treatment of human and animal diseases, with the single exception of trans-dodecenedioic acid.

It is noteworthy that transdodecenedioic acid is therapeutically effective in the treatment of diseases of humans; that it is beneficial in the treatment of psoriasis and numerous skin conditions as well as exhibiting the vulnerary characteristics for which the aloe plant has been traditionally employed for centuries, an aid in the healing of wounds, burns, ulcers, contact dermatitis and other conditions; that it differs in this important respect from any other closely allied dicarboxylic acid analog recognized with dodecenedioic acid as a plant stimulant.

The cobalt salt of TTA is far more effective than TTA.

Preparation of TTA cobalt salt

Three hundred milligrams of TTA were dissolved in 300 milliliters of boiling distilled water. An excess of cobalt carbonate, 250 milligrams, was added to the boiling solution, forming a pink-violet slurry. After 10 minutes of continued boiling, and filtering, the filtrate was evaporated to about 150 milliliters and let stand overnight. Two sets of crystals formed the first, on the bottom of the container, were long (1–3 millimeters) and ruby-red. The second set were colorless and floated on the filtrate liquid. The ruby-red crystals were separated by decanting the other crystals and filtrate and dried on unglazed porcelain. After recrystallization from distilled water, a yield of 90 milligrams of ruby-red was realized. Quantitative analysis revealed a cobalt content in the powder of 20.58%, in close agreement with a single cobalt salt of TTA (theor.: 20, 593%).

Cobalt dodecenedioate is therapeutically effective in microgram dose, whether applied topically in any convenient compatible formulation preferably free of inhibiting antimetabolites, or injected in solution form, or administered perorally, or included in rectal or vaginal suppository form, or as a micro- or other clysma.

A completely unpredicted effect of the salt is its action toward infections in animals and in humans.

EXAMPLES (A) It has been demonstrated that psoriatic scales recovered from an individual afflicted with the disorder contain considerably less free amino-nitrogen than the unblemished skin of a normal individual (A.M.A. Archives of Dermatology, 78:14, 1958), and that in the treatment of the disease, the free amino-nitrogen in the skin returns to more normal values as the conditions responds favorably to therapy. Psoriatic scales are soaked in Duponol, the solution filtered and the filtrate treated with ninhydrin. Normal skin shows a strongly positive amino acid nitrogen reaction (purplish coloration) which is less intense and even practically negative in proportion as psoriasis remains untreated, but on satisfactory treatment, the free amino-nitrogen returns in psoriatic skin and approaches normal values as the lesions are dissipated and finally essentially disappear. The test can be quantitated by weighing the scales, preparing definite concentration of the test solutions, using definite volumes of the reagents and reading the color in any appropriate colorimeter. By this procedure lesions treated with cobaltous dodecenedioic acid disappear more promptly and their free amino-nitrogen content resumes normal values in many more cases of psoriasis than when treated with the free acid; and of great importance, a solution containing 5 milligrams of cobaltous dodecenedioic acid per milliliter of distilled water is effective in the treatment of psoriasis on the deep intramuscular injection of 1 milliliter amounts every other day, whereas the injection (as opposed to the topical application) of free dodecenedioic acid preparations do not produce similar clinical response in this disease.

(B) Clinically, the following conditions have given completely satisfactory responses amounting to "cures" in occasional instances of the disease mentioned, in every other instance the cobaltous salt of the acid exhibiting uniformity more prompt responses, in more cases and nearly always greatly more complete regression in such conditions, such as psoriasis, that are refractory to treatment and quite frequently recur in humans; unindurated acne, neurodermatitis, seborrheic dermatitis, psoriasis, first and second degree burns however produced, and in suppository or other intravaginal and rectal application for the relief of pruritus which responds effectively to the free acid or to its cobaltous salt.

Cobalt TTA is appropriately suited for the formulation of all usual forms of medical administration, e.g. in ointments, lotions, dispersed through talc as a dusting powder, made into vaginal or rectal suppositories and in sterile saline solution for intramuscular injection.

Aside from its use alone, either the cobalt TTA may be used in admixture with other medication and presented in the form of soaps, ointments, lotions and such other forms as are common to the dispensation of drug and medicated cosmetic formulations.

I claim:
1. Method of treating skin conditions selected from the group consisting of unindurated acne, neurodermatitis, seborrheic dermatitis, psoriasis, burns, ulcerations and pruritis which comprises applying to the infected animal or human host cobaltous trans-traumatate in an effective amount for treating said skin conditions.

References Cited
UNITED STATES PATENTS
2,339,259   1/1944   English et al. _____ 260—535

OTHER REFERENCES
Holler, Chemistry of Organic Compounds, W. B. Saunders Co., Philadelphia, 1965, p. 181.

JEROME D. GOLDBERG, Primary Examiner